Aug. 13, 1929.　　　　J. BATH　　　　1,724,634
SHAFT BEARING
Filed Jan. 10, 1925　　　2 Sheets-Sheet 1
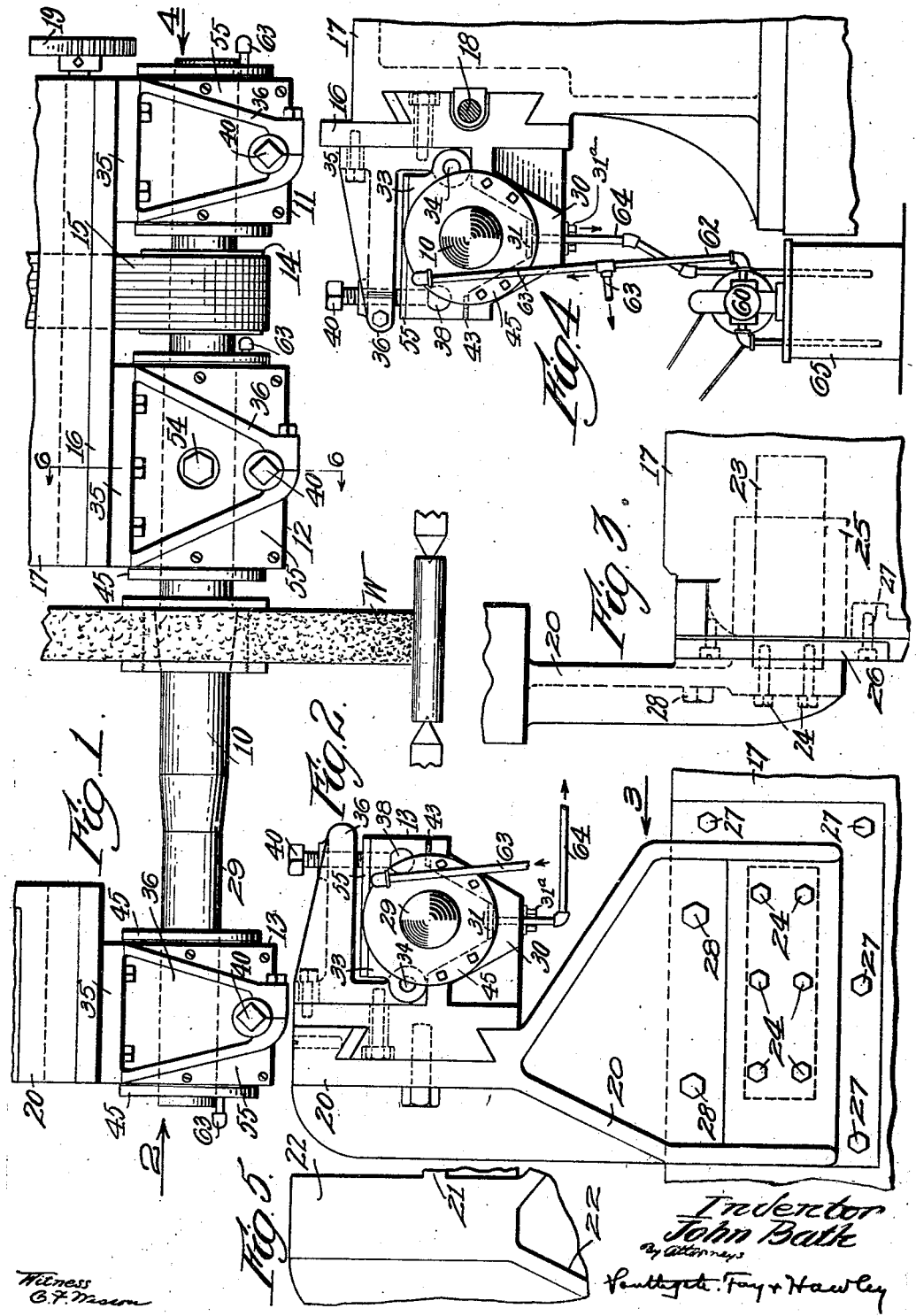

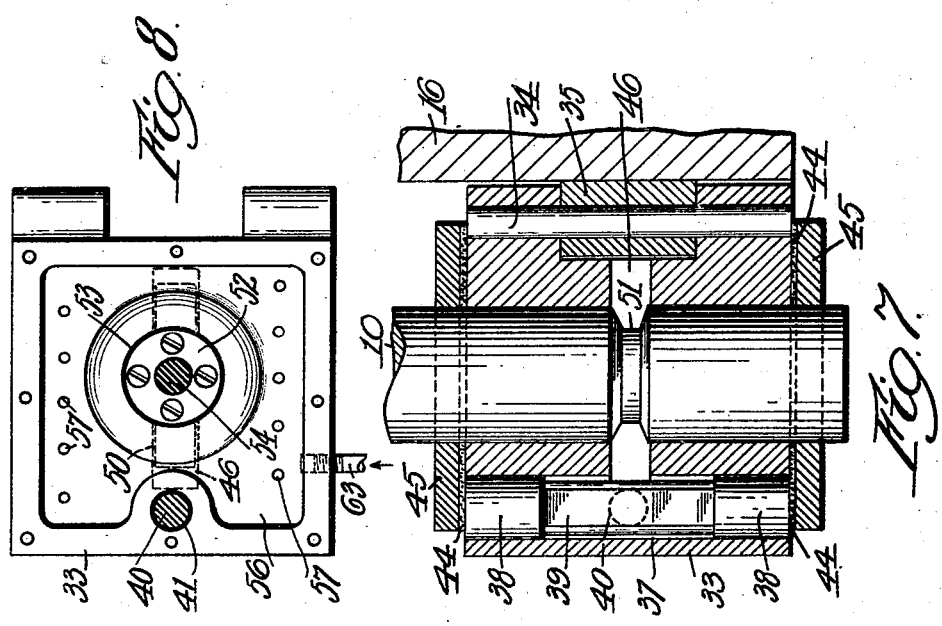
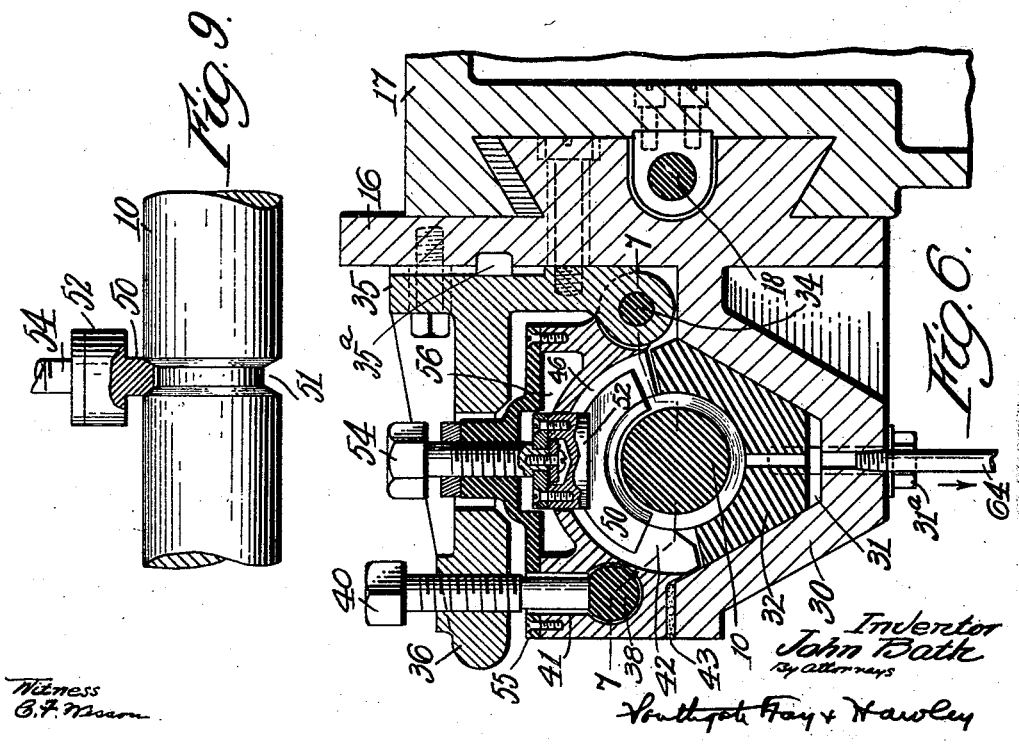

Patented Aug. 13, 1929.

1,724,634

UNITED STATES PATENT OFFICE.

JOHN BATH, OF WORCESTER, MASSACHUSETTS.

SHAFT BEARING.

Application filed January 10, 1925. Serial No. 1,702.

This invention relates to a bearing capable of general application but particularly designed for a wheel shaft or spindle bearing in a cylindrical or other grinding machine. Important objects of the invention relate to the provision of a series of bearings by which the shaft may be firmly and rigidly supported at a plurality of separated points; to an improved construction for mounting said bearings; to an improved system of lubrication for the bearings; to improvements in the construction of the bearings themselves; and to means for holding the shaft from axial movement. These features of my improved bearing construction provide increased ease and accuracy of adjustment, eliminate end play, provide effective lubrication, and permit convenient removal and replacement of the parts.

My invention further relates to arrangements and combinations of parts which will be hereinafter described and more particularly pointed out in the appended claims.

A preferred form of the invention is shown in the drawings, in which

Fig. 1 is a plan of my improved shaft bearing;

Fig. 2 is an end view thereof, looking in the direction of the arrow 2 in Fig. 1;

Fig. 3 is a partial front elevation, looking in the direction of the arrow 3 in Fig. 2;

Fig. 4 is an end elevation, looking in the direction of the arrow 4 in Fig. 1;

Fig. 5 is a detail elevation of a slight modification;

Fig. 6 is a sectional elevation of one of the bearings, taken along the line 6—6 in Fig. 1;

Fig. 7 is a sectional plan view, taken along the line 7—7 in Fig. 6;

Fig. 8 is a plan view of the bearing cap; and

Fig. 9 is a detail view to be described.

Referring to the drawings, I have shown a wheel shaft 10 rotatable in bearings 11, 12 and 13 and driven by a pulley 14 and belt or chain 15. The bearings 11 and 12 are preferably formed upon a single slide 16 (Fig. 4) which is longitudinally adjusted in dove-tailed guide-ways in the machine frame 17. An adjusting screw 18 engages a nut (not shown) on the slide 16 and may be rotated by a gear 19 from any suitable source of power to adjust the slide 16 axially.

The bearing 13 is slidably mounted in a support 20 but only manual axial adjustment is provided, as close axial adjustment is not required. In Fig. 5, I have indicated a slight modification in which a bearing bracket 21 is formed integral with the bearing support 22 instead of as a separate slidable member.

The support 20 (or 22 as the case may be) is provided with a rectangular projecting member 23 which is accurately finished on its various surfaces and is rigidly secured to the support 20 by a plurality of bolts 24. The projecting member 23 fits accurately in a recess formed in an inwardly projecting hub 25 of a plate 26 secured to the frame 17 by bolts 27. The support 20 is secured to the plate 26 by two or more clamping screws or bolts 28.

The bearing 13 and support 20 may thus be readily removed from the machine frame 17, simply by taking out the bolts 28 and sliding the projection 23 outwardly along the recess in the hub 25. The outer shaft bearing 13 is thus very easily removed to permit a change of the grinding wheel W. The bearing 13 is commonly of slightly less inside diameter than the bearings 11 and 12 and the shaft 10 has a correspondingly reduced portion 29 over which the wheel may be more readily removed. Taper seats may be provided for one or more grinding wheels and bearings and any usual provision may be made for securing the wheels and bearings in position on the shaft.

The construction of the three bearings 11, 12 and 13 is or may be substantially identical in many respects. The construction shown in Figs. 6 to 9 is not only illustrative of these general features of all three bearings, but also shows certain special features of the bearing 12. It will be understood that the bearings also vary in length and diameter, as may be required.

A bearing bracket 30 (Fig. 6) is preferably formed integral with the slide 16 and projects forward from the lower portion thereof. This bracket 30 has a substantially V-shaped depressed portion 31 which receives a half-bearing member 32 which is accurately seated therein and receives the downward thrust of the shaft. A screw $31^a$ seats the member 32 in the V-shaped depression 31 and thin shims may be inserted on either or both inclined faces thereof to adjust the bearing or take up wear.

A cap 33 is pivoted at 34 on a frame member 35 which is vertically adjustable on the slide 16 and which has a forwardly projecting rigid arm 36. The cap 33 has a cylindrical recess 37 in which is rotatably mounted a cylinder 38 having a flattened seat 39 in its upper middle portion. An adjusting screw 40 is threaded in the arm 36 and projects through an opening 41 in the cap 33 to engage the seat 39 of the cylinder 38.

The roll and screw are preferably hardened and the roll is angularly movable in the recess 37 to adjust itself for accurate engagement by the end of the screw 40, which thus forces the half-bearing portion 42 of the cap 33 against the shaft 10. A felt packing 43 (Fig. 6) may be provided between the bracket 30 and cap 33, and felt washers 44 (Fig. 7) may be provided at the ends of the bearings, said washers being retained in position by collars 45. These washers and packing make the bearing oil-tight, so that forced lubrication may be used.

The provision of both vertical and angular adjustment for the cap 33 and for the upper bearing portion 42 is of very great importance. By different combinations of these adjustments, the direction of application of the bearing pressure may be varied and the shaft may be firmly seated in the lower bearing, even after the latter has become more or less worn. For illustration, if the frame member 35 is raised and the adjusting screw 40 is lowered, the upper bearing member will engage more firmly at the front portion of the shaft, tending to push the shaft backward and downward. If the screw 40 is raised and the member 35 is lowered, the opposite effect will be produced.

The cap 33 is provided on its under face with a recess 46 adapted to receive a segmental bearing block 50 (Fig. 9) having inclined or wedge-like side faces. The block 50 fits accurately in an annular groove 51 of similar cross section formed in the shaft 10. The block 50 also has a hub portion 52 extending upward through an opening 53 in the cap 33 and is provided with an adjusting screw 54 threaded into a cover plate 55 which forms the top of the cap 33.

By turning the screw 54, the block 50 may be forced downward into the annular groove 51 and when closely seated therein will substantially eliminate end play of the shaft. If it is desired to remove the shaft or to permit end play thereof, the block 50 may be raised to clear the shaft 10, sufficient clearance being provided in the cap 33 and cover 55. The block 50 and groove 51 are commonly provided at one bearing only, thus permitting free axial expansion or contraction of the shaft as its temperature changes.

An oil chamber 56 (Fig. 6) is provided in the cap 33 and is connected through numerous perforations 57 (Fig. 8) to supply oil to the shaft. Forced lubrication is preferably employed and for this purpose an oil pump 60 (Fig. 4) is connected by a pipe 62 and branch pipes 63 to each of the oil chambers 56. Similarly each recess or depressed portion 31 of the bearing brackets is connected by return pipes 64 to a tank 65 from which it is drawn by the pump 60.

Having thus described the details of construction of my improved shaft bearing, the advantages thereof will be readily apparent. The arm 36 is adjustable vertically on the plate or slide 16 to approximate position and the cap 33 may be additionally adjusted by the screw 40 to take up wear or lost motion between the bearing members 32 and 42, as above described. If the member 32 becomes sufficiently worn so that the bearing is below the desired axis, it may be very easily raised to the desired position by placing a shim of paper or other thin material between one or both inclined surfaces of the member 32 and the bracket 30. The block 50 may be adjusted to eliminate any end play; the bearings are practically dust-proof; and ample and efficient lubrication is provided.

A grinding wheel shaft, when supported in a series of bearings of the type described and positioned as indicated in Fig. 1, rotates with great steadiness and accuracy and the finest grade of work may be produced.

Having thus described my invention and the advantages thereof, I do not wish to be limited to the details herein disclosed otherwise than as set forth in the claims, but what I claim is:—

1. In a shaft bearing, a bearing bracket, a cap pivoted above said bracket and having a segmental recess, a shaft having an annular groove with inclined side walls, a segmental bearing block mounted within the recess in said cap, and means to adjust said block toward and from said shaft.

2. In a shaft bearing, a bearing bracket, a cap pivoted above said bracket and having a segmental recess, a shaft having an annular groove with inclined side walls, a segmental bearing block mounted within the recess in said cap, a cover for said cap, and an adjusting screw threaded in said cover and effective to force said block toward said shaft.

3. In a shaft bearing, a bearing bracket, a segmental bearing member seated therein, a rigid arm projecting above said bracket, a cap for said bearing pivoted to said arm, and means on said arm to engage said cap and force said cap downward, said cap having an enclosed oil chamber therein and provision being made for forcing lubricant into said chamber and for removing the lubricant from the lower portion of said bearing.

4. In a shaft bearing, a bearing bracket, a pivotally mounted bearing cap, a cylinder rotatably mounted in said cap and having a flattened face, a rigid arm, and an adjusting screw threaded in said arm and engaging the flattened face of said cylinder.

5. In a shaft bearing, a bearing bracket, a segmental bearing member seated therein, a frame member mounted for linear adjustment toward and from said shaft, an upper bearing member pivotally mounted on said adjustable frame member, and means to adjust said upper bearing member about its pivot.

In testimony whereof I have hereunto affixed my signature.

JOHN BATH.